US011295125B2

(12) United States Patent
Roebuck

(10) Patent No.: US 11,295,125 B2
(45) Date of Patent: Apr. 5, 2022

(54) DOCUMENT FINGERPRINT FOR FRAUD DETECTION

(71) Applicant: HRB Innovations, Inc., Las Vegas, NV (US)

(72) Inventor: Eric R. Roebuck, Shawnee, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 320 days.

(21) Appl. No.: 16/525,835

(22) Filed: Jul. 30, 2019

(65) Prior Publication Data

US 2021/0034861 A1 Feb. 4, 2021

(51) Int. Cl.
*G06K 9/00* (2006.01)
*G06Q 10/10* (2012.01)
*G06Q 40/00* (2012.01)

(52) U.S. Cl.
CPC ..... *G06K 9/00483* (2013.01); *G06K 9/00456* (2013.01); *G06K 9/00469* (2013.01); *G06Q 10/1053* (2013.01); *G06Q 40/123* (2013.12); *G06Q 40/125* (2013.12)

(58) Field of Classification Search
None
See application file for complete search history.

(56) References Cited

U.S. PATENT DOCUMENTS

| 10,733,374 B1* | 8/2020 | Samid | G06F 40/166 |
| 10,922,484 B1* | 2/2021 | Pereira | G06F 40/205 |
| 11,182,121 B2* | 11/2021 | Barnes, Jr. | G06Q 20/20 |
| 2019/0173890 A1* | 6/2019 | Deka | H04L 63/08 |
| 2019/0392196 A1* | 12/2019 | Sagonas | G06N 3/04 |
| 2020/0169411 A1* | 5/2020 | Drake | G06F 21/64 |
| 2021/0312557 A1* | 10/2021 | Knarr | G06Q 40/08 |

FOREIGN PATENT DOCUMENTS

| CN | 109064603 A | * 12/2018 | |
| CN | 110335145 A | * 10/2019 | |
| CN | 110381218 A | * 10/2019 | |
| WO | WO-2019119642 A1 | * 6/2019 | G06Q 10/103 |

* cited by examiner

*Primary Examiner* — Mohammed Rachedine
(74) *Attorney, Agent, or Firm* — Erise IP, P.A.

(57) ABSTRACT

Embodiments of the invention provide systems and methods of determining the authenticity of a document by creating a document fingerprint from known authentic documents and comparing the document to the document fingerprint. A plurality of authenticated documents may be compared to determine like characteristics. The documents containing like characteristics may be categorized based on the similarities while determining that the documents are of the same type, from a same company, and for a same user. Information from a data layer, user interface layer, and a device associated with the document may be obtained and a document fingerprint for the document created using the information. Upon receipt of a document submitted for authenticity, the document may be similarly categorized and compared to the document fingerprint for authenticity. A likelihood of authenticity and a fraud score may be determined and a rule, based on the fraud score and the likelihood, may be applied.

20 Claims, 5 Drawing Sheets

2019 W-2 and EARNINGS SUMMARY

This blue Earnings Summary section is included with your W-2 to help describe portions in more detail. The reverse side includes general information that you may also find helpful.

1. The following information reflects your final 2017 pay stub plus any adjustments submitted by your employer.

| Gross Pay | 86200.00 | Social Security Tax Withheld Box 4 of W-2 | 4650.00 | MO. State Income Tax Box 17 of W-2 SUI/SDI |
|---|---|---|---|---|
| Fed. Income Tax Withheld Box 2 of W-2 | 8500.00 | Medicare Tax Withheld Box 6 of W-2 | 1233.00 | Box 14 of W-2 |

2. Your Gross Pay was adjusted as follows to produce your W-2 Statement.

| | Wages, Tips, other Compensation Box 1 of W-2 | Social Security Wages Box 3 of W-2 | Medicare Wages Box 5 of W-2 | WA. State Wages, Tips, Etc. Box 16 of W-2 |
|---|---|---|---|---|
| Gross Pay | 86,200.00 | 86,200.00 | 86,200.00 | |
| Less 401(k) (D-Box 12) | 1,200.00 | 1,200.00 | 1,200.00 | |
| Reported W-2 Wages | 85,000.00 | 75,000.00 | 85,000.00 | 85,000.00 |

3. Employee W-4 Profile. To change your Employee W-4 Profile Information, file a new W-4 with your payroll dept.

KATE SARAH MCKINNON
100 OAK STREET
KANSAS CITY MO 64109

Social Security Number: 444-12-4578
Taxable Marital Status: SINGLE
Exemptions/Allowances:
FEDERAL: 3
STATE: 0

© 2017 ADP, LLC

---

W-2 Wage and Tax Statement  Copy 2019  OMB No. 1545-0008

| Copy C for employee's records | | | |
|---|---|---|---|
| d Control number 636518 LOS2/VQF | Dept. 157900 | Corp. | Employer use only A | c Employer's name, address, and ZIP code
COMEDY CLUB
4000 MAIN STREET
KANSAS CITY MO 64109 e/f Employee's name, address, and ZIP code
KATE SARAH MCKINNON
100 OAK STREET
KANSAS CITY MO 64109

| b Employer's FEDID number 11-1234567 | a Employee's SSA number 444-12-4578 |
|---|---|
| 1 Wages, tips, other comp. 85000.00 | 2 Federal income tax withheld 8500.00 |
| 3 Social security wages 75000.00 | 4 Social security tax withheld 4650.00 |
| 5 Medicare wages and tips 85000.00 | 6 Medicare tax withheld 1233.00 |
| 7 Social security tips | 8 Allocated tips |
| Verification Code 5DC8-0FA8-9271-1D3A | 10 Dependent care benefits |
| 11 Nonqualified plans | 12a See instructions for box 12 W \| 1200.00 |
| 14 Other | 12b \| |
| | 12c \| |
| | 12d \| |
| | 13 Stat emp. \| Ret. plan X \| 3rd party sick pay |
| 15 State \| Employer's sstate ID no. MO | 16 State wages, tips, etc. |
| 17 State income tax | 18 Local wages, tips, etc. |
| 19 Local income tax | 20 Locality name |

| | OBJECT | LOCATION | SIZE | WEIGHT | ... |
|---|---|---|---|---|---|
| 208 | APP | 8.1 - 2.2 | 12 | 1.0 | |
| 206 | COMEDY CLUB | 3.1 - 2.5 | 12 | 1.0 | |
| 214 | LINE | 3.1 - 2.5 | 0.5 - 4.5 | 0.5 | |
| 312 | SPECIAL CHARACTER | | 48TVPOJ9# | | |

DOCUMENT FINGERPRINT FOR FRAUD DETECTION

BACKGROUND

1. Field

Embodiments of the invention relate to detecting fraud. More specifically, embodiments of the invention relate to creating original fingerprints associated with documents for detecting fraud.

2. Related Art

Current methods of detecting fraudulent documents are based on comparing information associated with a user with historical information associated with the user and information known to be fraudulent. A fraudster may obtain information associated with the user and create documents that may not be detected by current typical methods of detection that utilize only user information for comparison. Further, when a document is suspected of being fraudulent, additional documents are requested for verification of the user's identity. The additional documents again may be fraudulent or current methods may not detect the fraudulent document as only the information on the document indicative of the user is compared to stored information associated with the user.

What is needed is a system and method of detecting fraudulent documents by utilizing information associated with the document itself rather than relying on the information provided on the document. Embodiments described herein may utilize Optical Character Recognition (OCR), data-layer information provided on a data layer of the document, and information obtained from devices used to send and receive the document to determine authenticity of the document and/or verify the identity of the user or any entity associated with the document. The combination of these security measures provides a level of security to the document, the user, and the company associate with the document that cannot be seen or detected by a fraudster.

Embodiments of the invention provide a variety of benefits to the user, to a company associated with documents and the user, to a person or persons holding accounts with the company, and to citizens whose tax payments go to fraud prevention. Creating a document fingerprint based on data-layer information, special or sequenced characters, and information directly related to hardware components or peripheral device of a device associated with the documents are security measures that directly impact people and companies. These measures prevent fraudulent documents, identity theft, and save money for potential victims of fraud as the money needed for fraud prevention is reduced.

SUMMARY

Embodiments of the invention solve the above-mentioned problems by providing a system and method of determining the authenticity of a document by creating a fingerprint from known authentic documents and comparing the document to the fingerprint. A plurality of authenticated documents may be obtained and compared to determine like characteristics. The documents containing like characteristics may be categorized based on the similarities and a determination that the documents are of the same type, from a same company, and for a same user. Information from a data layer, user interface layer, and a device associated with the document may be obtained and a fingerprint for the document created using the information. Upon receipt of a new document submitted for authenticity, the submitted document may be similarly categorized and compared to the document fingerprint for authenticity. A likelihood of authenticity and a fraud score may be determined. A rule based on the fraud score and the likelihood as compared to a threshold may be applied.

A first embodiment is directed to one or more non-transitory computer-readable media storing computer-executable instructions that, when executed by a processor, perform a method of comparing a first document with a document fingerprint for authenticating the first document, the method comprising the steps of obtaining the first document comprising sensitive information, obtaining data-layer information associated with the first document, comparing the data-layer information with the document fingerprint comprising information obtained from at least one second document, and determining, from the comparison, a likelihood of the first document being fraudulent.

A second embodiment is directed to one or more non-transitory computer-readable media storing computer-executable instructions that, when executed by a processor, perform a method of creating a document fingerprint for authenticating a document, the method comprising the steps of receiving a plurality of documents, obtaining data-layer information associated with each document of the plurality of documents, comparing the data-layer information for each document, categorizing each document based on the comparison of the data-layer information, creating at least one document fingerprint based on the data-layer information associated with each document, receiving the document to be authenticated, and determining a likelihood of authenticity of the document based on a comparison of the document and the at least one document fingerprint.

A third embodiment is directed to a method of creating a document fingerprint and comparing the document fingerprint to a document for authenticating the document, the method comprising the steps of receiving a plurality of documents, obtaining document characteristics associated with each document of the plurality of documents, comparing the document characteristics for each document, categorizing each document based on the comparison of the document characteristics, creating baseline document characteristics from the plurality of documents for each category, wherein the baseline document characteristics are an average of characteristic values associated with the document characteristics, creating at least one document fingerprint based at least in part on the baseline document characteristics for each category, receiving the document to be authenticated, and determining a likelihood of authenticity of the document based at least in part on a comparison of the document and the at least one document fingerprint.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein:

FIG. 2 depicts an embodiment of a document comprising sensitive information;

FIG. 3 depicts an exemplary embodiment of a document fingerprint;

Figure 1:
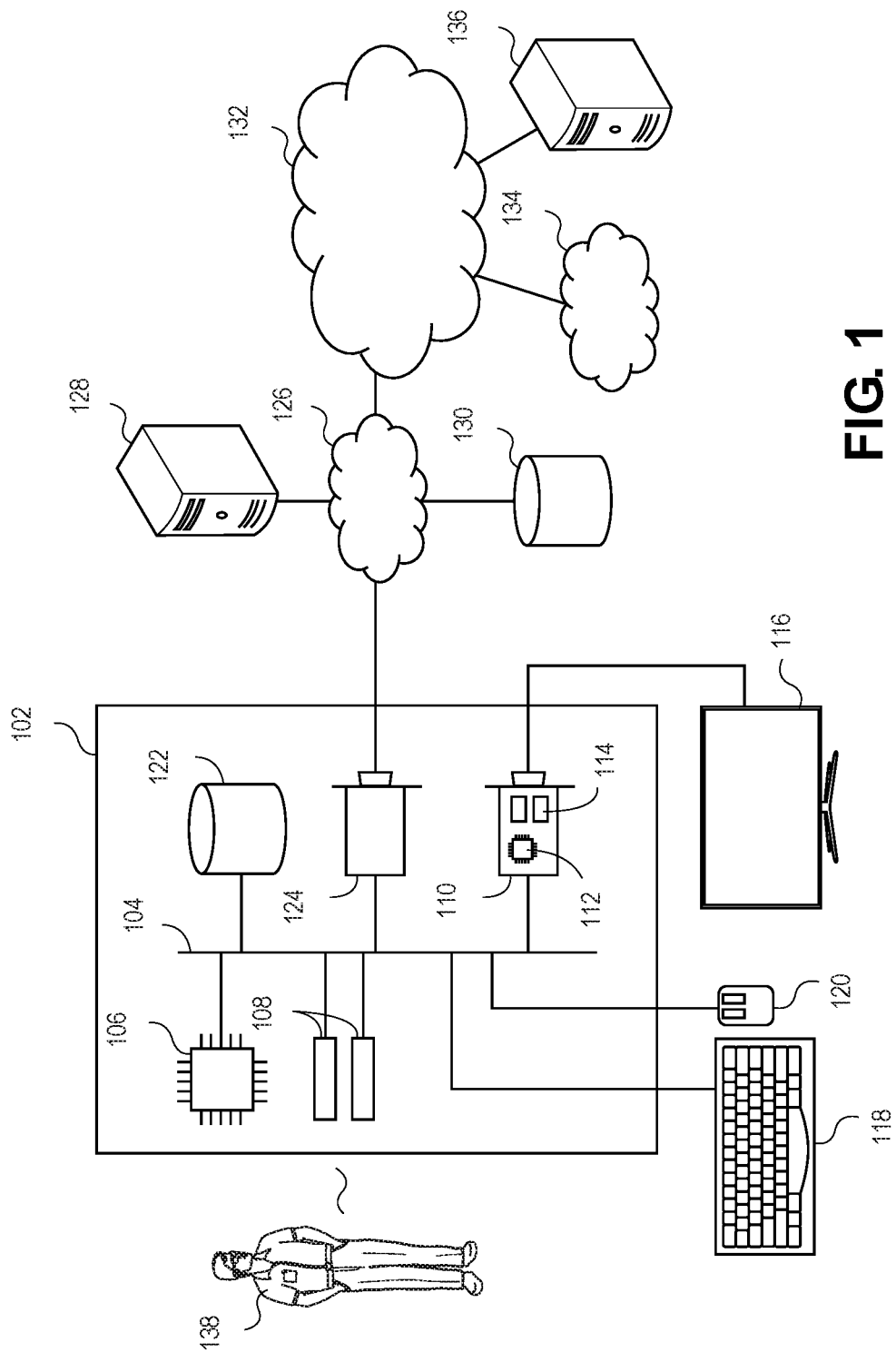
FIG. 1 depicts an embodiment of a hardware system for implementing embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the art by providing a method and system for detecting fraudulent documents by accessing data associated with and indicative of the document. In some embodiments, information associated with documents that do not simply provide information related to an individual or company are obtained from the document. The information associated with the document may be characters and location of characters, how certain character blocks are structured and even the order of layout of certain characters and may be obtained via OCR or from the data layer or metadata of the document. Some information may not be visible in the user interface layer of the document providing a level of security that may not be duplicated fraudulently by a fraudster that does not have access to the fingerprint comprising the information. The information from verified documents may be combined to create a document fingerprint for a particular type of document, a particular company, or for a particular user. New and/or questionable documents may be compared to the document fingerprint to determine a fraud score based on the probability of the document being fraudulent as compared to the document fingerprint. In some embodiments, rules may be applied based on the fraud score.

Fingerprinting documents for detection of fraudulent documents as well as using OCR and accessing the data layer of the document to create a document fingerprint associated with a known authentic document or plurality of authentic documents impacts people and companies in many positive ways. Embodiments of the invention can detect and reduce fraudulent activity, reduce the number of fraudulent documents, and reduce the cost of fraud to people, companies, and taxpayers. Further, using data-layer information, metadata (such as last time the document was modified, who modified it, and so forth, and information associated with devices associated with the documents and using time and location from which the document was obtained connects the user and the device with analysis and fraud detection and prevention. Combining the analysis of the digital hardware with the analysis of the software that is associated with the documents and associated with and indicative of a company are layers of analysis that are new, unique, and provide a real-world benefit to the users and the companies associated with the documents and the application.

As described herein, the term fingerprint or document fingerprint represents any information or data associated with an item, either physical or virtual, for the purpose of identifying the item. In some embodiments, the fingerprint may comprise information associated with a user or company, employer, or entity that either created or is associated with the document. In some embodiments, the document fingerprint may comprise information obtained from the user input layer or visual document, data layer used to create the document, or information provided by the entity associated with the document, or any combination of these items The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, an application for determining fraudulent documents may run on the computer 102 and the computer 128 which, in some embodiments, may be mobile devices or may be accessed via mobile devices and run in a web-based environment from a web browser of the user 138 or any entity that is testing documents for authenticity. The web-based environment may store data such that it is not required for the mobile device or computer to have downloaded and stored large amounts of data for the application. Transmitters and receivers may be associated with any devices as described above for transferring data and communication. The application may access data such as object databases, user profiles, information related to other users, financial information, third-party financial institutions, third-party vendors, social media, or any other online service or website that is available over the internet.

In some embodiments of the invention, the application may access or store a profile of the user 138 or a profile associated with a company. In some embodiments, the user 138 may be an employee, patient, client, company, or any entity that has sensitive information on documents. The user 138 may be any person or persons that access the application through any application accessible device. The application may be downloaded on the mobile device which, in some embodiments, is computer 102 or accessed via the Internet as in a cloud-based application. In some embodiments, the application may access any of a plurality of peripheral devices of the mobile device such as a camera, microphone, GPS, or any other peripheral device that may be useful in embodiments as described below. The application may access any information from the mobile device such as, for example, GPS location, IP address, metadata, date and time, and mobile device type.

In some embodiments, the user 138 may have a stored account or, in the case of a first-time user, the user 138 may set up an account associated with the application. The application may store user information associated with or indicative of the user 138. The user information may be, for example, name, date of birth, social security number, address, financial information, medical history, tax information, and a history of any of the above, as well as any other information associated with or indicative of the user 138. Further, the user information may be obtained or received from the user 138 or any account associated with the user 138 accessible by the application such as for example, financial accounts, social media accounts, personal accounts, or any other account storing information that may be useful for determining the authenticity of documents associated with the user 138.

The profile of the user 138, in some embodiments, as stored by the application at a database accessible by the application, may also store historical information based on the actions or interactions of the user 138 with the application. Financial transactions, medical records, government documents, tax filing histories, and any information gathered from the user 138 or any of the associated accounts mentioned above may be used to assist in determine fraudulent documents associated with the user 138. Any documents obtained by the application may be categorized and related or associated based on any information obtained. Further, the information obtained may be used to create a fingerprint associated with the document, user 138, a company, or any entity associated with the document.

Turning to an exemplary embodiment depicted in FIG. 2, a document 200 comprising sensitive information associated with an employee 202 and a company 204 may be submitted or obtained by the application. In some embodiments the employee 202 may be the user 138. In some embodiments, the application may obtain or receive the document 200 from the user 138 or a third-party such as, for example, the employer or company 204 of the employee 202, a federal agency, a state agency, and a tax preparation company. In some embodiments, the third party may be an entity 208 associated with the company 204 such as a payroll service provider, records keeper, investment company, insurance provider, or any other entity that may provide a service to the company 204 or employee 202. In some embodiments, the company 204 may be the entity 208 and may create and store data-layer information for the document 200.

In some embodiments, the document 200 may be medical records, school records, career records, financial records, police reports, legal documents, bank records, secret government documents, or any documents that may contain sensitive material or otherwise may be kept secret. The document type 206, as described in embodiments herein, is a W-2 for exemplary purposes only.

In some embodiments, the application may determine characteristics associated with the document 200 such as, for example, the document type 206, the entity 208 logo, the company 204 name and address information, employee 202 information, Employer Identification Number (EIN) 210, wages 212, or location and dimensions of any other characters, blocks (groups) of characters, or document objects such as lines, images, figures, or any other non-character related document object on the document 200. For example, the length and location of a line 214 may be determined with OCR or from the data associated with the line 214 from the data layer used to create the document image. Further, the distance 216 from the line 214 to a line 218 may be determined. Any information provided though text or objects associated with the document 200 may be used for creating the document fingerprint.

FIG. 3 depicts an exemplary representation of a document fingerprint 300. A plurality of documents analyzed for creating the document fingerprint 300 may have all been determined to be W-2s, such that the documents and the document fingerprint 300 are categorized as W-2 302. Further, associated objects 304 for analyzing documents may be stored in the document fingerprint 300. In some embodiments, the objects 304 may be the entity 208, the company 204, and the line 214, all obtained from the data layer of the document 200. The location 306, size 308, and weight 310 of the objects 304 may be stored in the document fingerprint 300 for comparing to future submitted documents for analysis. The document fingerprint 300 is exemplary only and any information obtained from the data layer, user input layer, and devices may be used for analysis.

In some embodiments, the information obtained from the data layer may be compared and combined to create the fingerprint. In some embodiments, the information may be a character, blocks or groups of characters, and location of characters and blocks of characters. In some embodiments, the location of the characters and blocks of characters is compared to create a fingerprint. For example, blocks of character representing address or name or blocks of characters representing address and name may be used to create a fingerprint. For example, the data layer for the APP W-2 may be scanned to find that the address 202 comes before the name 204 of the taxpayer in the data layer. After evaluating legitimate W-2s from APP it is determined that the address always comes before the name location-wise on the data layer. This is then used as all or a portion of the fingerprint for APP W-2 forms. All submitted documents categorized as APP W-2s may be compared to this fingerprint to either verify document legitimacy or provide a score indicative of fraudulent activity based on the comparison of the submitted document with the fingerprint.

In some embodiments, the document fingerprint 300 may comprise a special character 312. The special character 312 may be provided by the entity that created the document. For example, the entity 208 associated with the company 204 may be a payroll company and may provide the W-2. The entity 208 may provide the special character 312 on the data layer of the document 200 for verification that the document 200 was created by the entity 208. This provides another layer of authentication and security for the company 204 and the employee 202.

Figure 4:
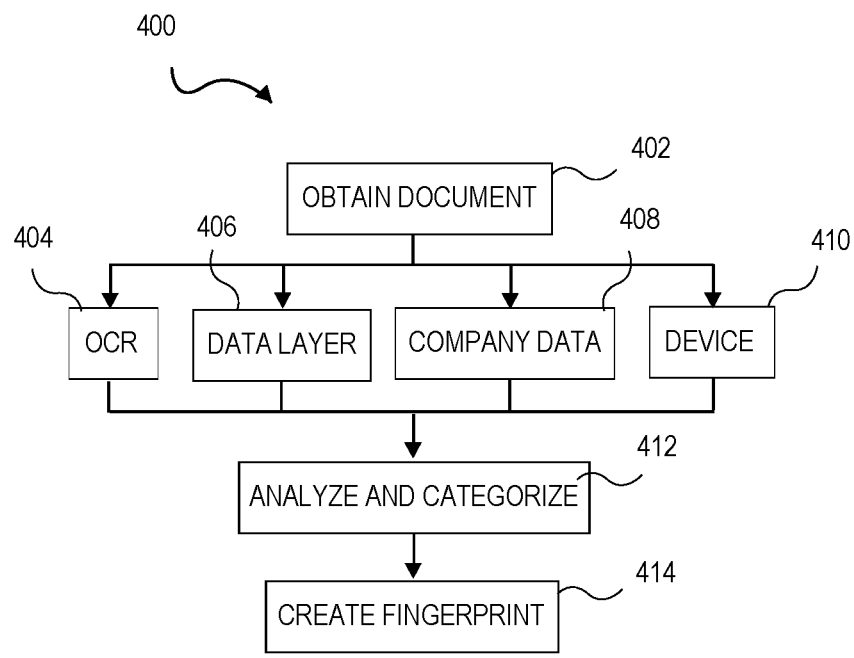
FIG. 4 depicts an exemplary flow diagram of embodiments of the invention of creating a document fingerprint for determining a fraud score.

FIG. 4 depicts an exemplary flow diagram 400 presenting a method of creating the document fingerprint 300 using the document 200. In some embodiments, a plurality of authenticated documents obtained from the entity 208 or a plurality of authenticated users is used to create the document fingerprint 300.

At a Step 402, in some embodiments, the application may obtain the document submitted by the user 138 or the third party. The application may obtain the document 200 from the user 138 or the third party by accessing an account associated with the user 138 at a user's personal account or the third-party account or otherwise receiving the document sent from the user 138 or third party. The user 138 may provide access to the document 200 and the application may access the accounts based on a user request or a time period such as, for example, at quarterly and annual tax filing times, a time leading up to medical appointments, or at any other designated times that may be linked to the transfer of documents containing sensitive subject matter. In some embodiments, the application may access any accounts with sensitive documents that contain secret subject matter that may be updated at particular times. The application may scan and store information, or characteristics, of the documents from the visual layer or data layer of the document to create fingerprints for any sensitive documents. In some embodiments, the application may collect all information associated with the documents from a data layer, a user interface layer, and metadata as described in embodiments below.

At a Step 404, in some embodiments, the application utilizes Optical Character Recognition (OCR) to recognize characters in the document. The application may recognize any characters, blocks of characters, lines, and objects as well as font, color, size, weight, and location of characters, blocks of characters, lines, and objects. The application may scan the document 200 and perform OCR on the scanned document. The OCR may compare the scanned characters or blocks of characters to a database of characters and blocks of characters and further compare fonts, color, width, and height of the characters and blocks of characters. In some embodiments, the location of the characters and blocks of characters is also compared. The OCR, in some embodiments, may also determine the length of lines such as line 214 and line 218 and determine the distance 216 between line 214 and line 218. The OCR may also determine the weight of the line 214. In some embodiments, the information obtained from OCR may be used to create the document fingerprint 300 or may be combined with any other information from at least one other document to create the document fingerprint 300. Further, a statistical analysis of a plurality of documents comprising the same or similar characteristics may be used to create a baseline document fingerprint.

At a Step 406, in some embodiments, the application may access the data layer of the document 200 to obtain data-layer information that may be used to create the document fingerprint 300. The data layer of the document may comprise the data or information necessary to build the document 200 in the user interface layer. The data layer may comprise the data-layer information for creating the characters, blocks of characters, lines, shapes, relative locations of each, and dimensions of the document 200 such that any information obtained in the document 200 may be provided through the data layer. The application may use any document characteristics and data-layer information obtained from the data layer to build the document fingerprint 300. In some embodiments, the information obtained from the data layer may be used to create the document fingerprint 300 or may be combined with any other information from a plurality of similar documents to create the document fingerprint 300.

At a Step 408, in some embodiments, information may be provided by the entity 208 that created the document 200 or the company 204 that provided the document 200 to create the document fingerprint 300. For example, the special character 312 such as strings of random characters or specifically selected characters may be added to the data layer that are not presented in the user interface layer. This creates a hidden aspect to the document fingerprint 300 that is not visible on the document 200. This allows the document fingerprint 300 to remain hidden from a potential fraudster.

In some embodiments, characters, blocks of characters, fonts, colors, relative locations, or any other characteristics associated with the document 200 may be stored on the data layer or as metadata for authenticating the document 200 as provided by the entity 208 creating the document 200. For example, the special characters 312 may be associated with the document 200 creating the hidden aspect of the document fingerprint 300 as described above. In some embodiments, a combination of the data-layer information, the visual information obtained through OCR, and any information provided by the entity creating the document 200 may be stored and used to create a document fingerprint 300 for document provided by the entity 208.

In some embodiments, the special characters 312 can be stored as the document fingerprint 300 for all documents sent from a particular company 204 or may be associated with documents sent specifically to the company 204 or user 138. For example, the entity 208 may create the document 200 with a list of special characters 312 associated with or representing the company 204 or the document type 206. These special characters 312 may be used to create the document fingerprint 300 such that any documents sent in the future that do not contain these special characters 312 will be recognized as fraudulent.

In some embodiments, the special characters 312 may be associated with the document type 206 or the company 204 or user 138 receiving the document 200. For example, the special characters 312 may be provided on the data layer of the document 200. The special characters 312 may be associated with the EIN 210 or the employee 202 and the document fingerprint 300 may be stored at the company 204. The company 204 may receive the document 200 and verify that the special characters 312 match the stored special characters for authentication of the document 200.

In some embodiments, the special characters 312 may be associated with the document 200 and a verification may be sent separately. For example, a new set of special characters may be created for each document sent and the special characters may be relayed for creating the document fingerprint via text, mail, email, or any other method of communication separate from the documents. The information obtained from the entity 208 may be used to create the document fingerprint 300 or may be combined with any other information to create the document fingerprint 300.

At a Step 410, in some embodiments, the application collects information from a device from which the document 200 is received. For example, the document 200 may be sent from a particular company 204 and an IP address or a regional IP address or a location associated with the sending device may be stored. In some embodiments, the document 200 may be sent from a mobile device. The application may obtain information from the mobile device such as type, year of mobile device, date and time, location, or any other information that may be available. In some embodiments, the application may request permission to access any associated peripheral device such as, a camera, microphone, storage, settings, or any other device information that may be useful in creating a device fingerprint to be associated with or included in the document fingerprint 300.

At a Step 412, in some embodiments, the application collects the information from the document 200 and combines the information to analyze the information and categorize the information and the document 200 to create the document fingerprint 300. The document fingerprint 300 may comprise characteristics of the document 200 such as at least one of text, images, dimensions, measurements, image location, relative location of marks within the image, or any other mark, line, or recognizable portion of the image in the document 200. Any of the information obtained by the application in embodiments described above may be used to categorize the characteristics such that the characteristics can be associated with a particular document. For example, the entity 208 logo, the document type 206, and the company 204 information may be retrieved from the data layer and combined. The combination of this information categorizes the document 200 such that it is compared with documents comprising similar information. As such, the document 200 is compared to W-2s for "Comedy Club" provided by "APP." Once it is determined that the document 200 is authentic any information and characteristics of the document 200 may be stored in the category and used to create the document fingerprint 300.

At a Step 414, in some embodiments, the document fingerprint 300 is created from the data-layer information as described above. In some embodiments, the document fingerprint 300 may comprise at least one of information obtained from OCR, information obtained from the data layer of the document 200, information provided by the company 204 and entity 208 that created the document 200, and information obtained from the device from which the document 200 was received. The document fingerprint 300 may comprise one of the above described stored characteristics of the document 200 or may comprise a plurality of characteristics of the document 200. In some embodiments, a statistical analysis of a plurality of documents may be utilized to obtain baseline characteristics and data-layer information such as characters, dimensions, and any other of the characteristics discussed above. The baseline characteristics may be characteristic values or may be assigned characteristic values for determining averages and standard deviations between the plurality of documents. The baseline determination of data-layer information including document characteristics used for the document fingerprint 300 may provide a higher level of confidence of a likelihood that the document 200 is authentic by filtering any small variations between documents. Further, any special characters 312 may be included with the data-layer information along with the baseline data-layer information.

In some embodiments, average or baseline values for the document fingerprints may be created from multiple documents that have the same or similar characteristics and categorized as such. For example, it may be determined that the entity 208 logo is slightly larger than measured on a previously stored document associated with the company 204. A margin of error, or a closeness factor, may be determined based on the differences and compared to acceptable margins of error determined from tests of different image resolutions and errors associated with data transfer. Because of these differences, the document fingerprint 300 may be created from baseline averages of the document characteristics and data collected from the plurality of documents known to be authentic.

In some embodiments, the baseline values may be associated with particular image resolutions or devices from which the images are received. The baseline values for the document fingerprints may be associated with any compensation factors for filtering possible errors in the received images as related to the stored images of the documents. The compensation factors may be applied to documents with known errors or documents within the margin of error or closeness factor as described above.

Figure 5:
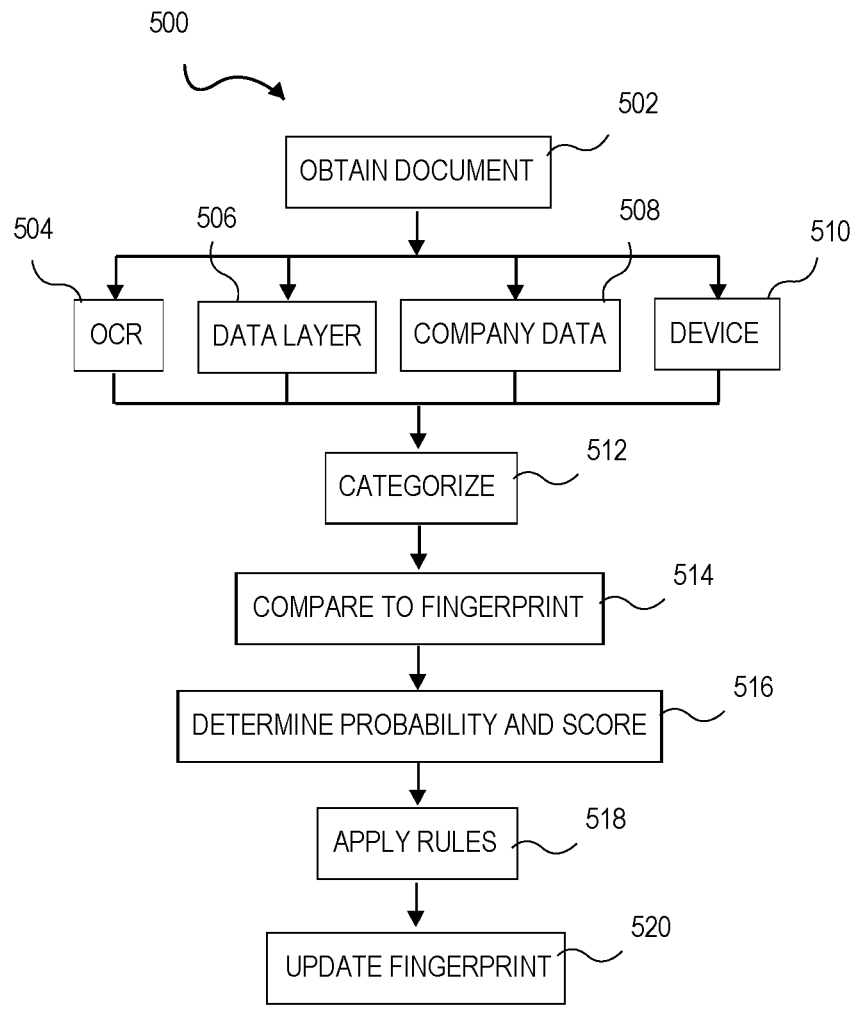
FIG. 5 depicts an exemplary flow diagram of embodiments of the invention of creating a document fingerprint and comparing the fingerprint to a document.

FIG. 5 depicts a flow diagram 500 presenting a method of determining a fraud score based on a comparison of the document 200 with the document fingerprint 300. In some embodiments, FIGS. 3 and 4 may be combined to create a single method for analyzing the document 200 then, upon determination of authenticity of the document 200, categorize and store the document 200 and use the document characteristics as the document fingerprint 300 for future document analysis. The separation into two methods is for simplicity in explanation only. In some embodiments, as described below, the document fingerprint 300 is created from a plurality of documents and the document 200 is submitted for authentication by comparison to the document fingerprint 300.

At a Step 502, the document 200 is received as described in embodiments above. The document 200 may be received from the entity 208 associated with the user 138 such as the employee 202, a payroll service provider, a medical facility, a financial institution, or any other entity holding sensitive information associated with the user 138. The document 200 may be received or obtained by the application accessing an account and requesting the document 200 or otherwise retrieving the document 200 or documents from the accounts. In some embodiments, the application may automatically obtain the document 200 at periodic times coinciding with tax filing times, patient visit times, and monthly or annual update times.

At a Step 504, the document 200 is scanned and OCR is implemented to determine characteristics of the document 200. The information obtained from the OCR may be used when the data layer of the document 200 is not available or in combination with the other data discussed above. In some embodiments the document 200 experience, or user input, layer may be accessed for characteristics associated with the document 200. These measurements and character recognition data points may be compared to stored data points associated with the document fingerprint 300 to provide useful information in determining if the document 200 is authentic. For example, the name, font, and color of the entity logo "APP" is scanned using OCR and it is determined that the company logo matches a stored image of the company logo within error. As such, a 98% probability of authenticity match is determined and assigned to the data point entity. This may be above an authentication threshold such that the document 200 may be labeled as authentic through a binary rule of labeling the documents as "authentic" or "not authentic." The authentication or, in some cases, the probability of fraud detection analysis may determine fraud levels from the data analysis based on the type and the number of data points.

At a Step 506, in some embodiments, the application may collect information from the document 200 data layer and store characteristics of the document 200 to compare to the document fingerprint 300. The application may scan the document 200 at the data layer and store characteristics such as specific characters 312, the location of specific groups of characters, measurements, fonts, colors, dimensions, and any other information that may be obtained from the document 200. For example, the document 200 may read "Comedy Club" as the company 204. The application may recognize the letters, the font, the color, the location, and the spacing of the text by scanning the data layer and looking for these specific characteristics. The application may look for these specific characteristics because the document fingerprint 300 is comprised of these specific characteristics determined from a plurality of documents as described above. Further, the application may recognize any text spacing such as, for example, the wage 212 and the location and the shape of any characters. The application may compare the characteristics obtained from the document 200 with the document fingerprint 300 comprising stored characteristics from the plurality of documents to determine a likelihood that the document 200 is authentic. Further, any data layer and metadata information provided may be accessed and analyzed. Document special characters and random characters from the data layer of the document 200 may be compared to the stored special characters 312 of the document fingerprint 300 for authentication of the document 200.

At a Step 508, the application obtains document special characters from the document 200. The document 200 may comprise document special characters in the data layer or included as metadata. The document special characters may be indicative of the document 200, the company 204, the employee 202, the EIN 210, the entity 208, or any other entity associated with the document 200, employee 202, or entity 208. The document special characters may be static such that they do not change and a set of document special characters associated with, for example, the entity 208 is always the same. In some embodiments, the document special characters may change periodically or for each document. The document special characters may be compared to the stored document fingerprint 300 comprising a stored set of special characters 312 for authentication of the document 200.

At a Step 510, in some embodiments, the document 200 may be received from a computer or mobile device. The document 200 may be sent digitally or may be scanned into the computer or mobile device by a scanner. In some embodiments, an image may be taken via a camera associated with the computer or mobile device. In some embodiments, peripheral devices such as cameras, GPS sensors, inertial sensors, or any other device may be automatically accessed by the application to obtain information that may be used to determine a fraud score associated with the document 200. Information such as IP address, location, computer or mobile device type, date and time, or any other information associated with the computer or mobile device may be compared to the document fingerprint 300 used to determine a fraud score associated with the document 200. In some embodiments, the computer or mobile device may be computer 102, 128, and 134.

In an exemplary scenario for the embodiment described above, the document 200 may be photographed and a resulting image sent to the application by the mobile device. The application may analyze the data layer of the image and determine an authenticity score of, for example, 90 based on the characteristics of the document 200 obtained from the data layer. Based on rules associated with an authenticity score of 90 the application accesses the mobile device location via a GPS sensor associated with the mobile device and compares the location with a stored location associated with the account for the user submitting document 200. The stored location may be accessed from an account of the user 138 associated with the company 204 that created the file or a profile of the user 138 associated with the application. Further, the stored location of the user 138 may be determined from a history of submitting documents such that the document type 206 may be associated with a previously submitted document and location of the user 138.

At a Step 512, the characteristics obtained from the document 200 may be analyzed to categorize the document 200 for comparison to the document fingerprint 300. In some embodiments, categories are created based on the type of document 200, the entity 208, the company 204, the employee 202, or any other characteristics as described above. Any characteristics determined from the document 200 may be matched to characteristics in the database associated with the application to determine a category for the document 200. Once the document 200 is categorized it can then be compared with the document fingerprint 300 associated with that particular category.

In some embodiments, a plurality of characteristics are associated with a plurality of categories. The document 200 characteristics may be compared to a plurality of categories to determine the best fit. In some embodiments, the characteristics are set into tiers where a first characteristic entity 208, categorizes the document 200 at tier 1, then company 204 categorizes the document at tier 2, then the EIN 210, categorizes the document at tier 3. The document fingerprint 300 may be stored based on the three tiers of categorization and compared to the document 200. For example, a set of random numbers such as 389470 may be stored at the data layer of the document based on the three tiers as described above. This may be a static number and may be compared to a stored document fingerprint based on the three tiers. When it is determined that the stored document fingerprint 300 includes the number, for example, 389470, the document 200 is labeled as authentic.

In some embodiments, a history of fraudulent documents is stored and the document 200 may be associated or categorized based on the characteristics determined to be fraudulent. For example, the document 200 may be compared to the document fingerprint 300 including the number 389470 as describe above. It is determined that the document 200 does not include the number at the data layer or in metadata. The application may then analyze the entire document 200 looking for inconsistencies. When inconsistencies are found they are stored in a database on known fraudulent characteristics and the company 204 and the entity 208 may be notified of the fraudulent document 200 as defined by rules discussed in more detail below.

At a Step 514, the characteristics obtained by the application from the document 200 are compared to the stored document fingerprint 300. Once analyzed and the document 200 categorized, the characteristics of the document 200 may be compared to the associated document fingerprint 300 characteristics. For example, the document 200 is categorized by document type 206 W-2 and entity 208 APP. The characteristics of the document 200 such as, for example, EIN 210, distance 216, as well as empty spaces and location of lines 214 and 218 are then compared to the document fingerprint for APP W-2 that is created from thousands of previously submitted authenticated APP W-2s. The document 200 is then given a score based on the amount and type of characteristics that match the document fingerprint 300 as described below.

At a Step 516 the characteristics from the document 200 may be compared to the document fingerprint 300 to determine a likelihood of fraud and a fraud score. In some embodiments, a likelihood of the document being fraudulent may be determined by the type of characteristic compared. For example, the type of characteristic may be distance 216. The distance 216 is measured and determine to be within an acceptable error as determined from a standard deviation calculation of a plurality of distances 216 measured to create the document fingerprint 300. This comparison of the document 200 with the document fingerprint may result in a low likelihood of being fraudulent because the distance 216 is within the designated error as determined by the average and standard deviation.

In some embodiments, different likelihoods may be provided to different types of characteristics. For example, an indication of fraudulent information at a label for wages 212 may be more indicative of fraudulent activity than a slightly different shade to the line 214. The different line 214 shade may result from scanning the document multiple times or using various devices with different resolution to image the document 200. A different location for wages 212 may indicate that the wages 212 value may have been altered thus providing a higher likelihood that the document 200 may be fraudulent. The fraudulent documents and the characteristics leading to the determination of the document 200 being fraudulent may be tracked over time and the likelihoods based on type may be determined from a statistical analysis of the history of fraudulent activity associated with the type of characteristics analyzed as described above.

Further, the number of instances of characteristic difference may be indicative of a fraudulent document. The relative locations of the company 204, EIN 210, and wages 212 may be different as compared to the document fingerprint 300. The number of differences may create a higher likelihood of the document 200 being fraudulent. The fraudulent documents and the characteristics leading to the determination of the document being fraudulent may be tracked over time and the likelihoods based on the number of characteristic differences may be determined from a statistical analysis of the history of fraudulent activity associated with the number of characteristics analyzed.

In some embodiments, fraudulent documents and characteristics leading to the determination that the documents are fraudulent may be tracked over time and stored in the application database and the likelihoods based on type and number may be determined from a statistical analysis of the history of fraudulent activity associated with the number of characteristics analyzed. In some embodiments, the likelihood determined by type of characteristics and the likelihood determined by number of characteristics may be combined to determine an overall likelihood that the document 200 is fraudulent. The overall likelihood may be presented as a total fraud score. Each likelihood may be determined then combined then a total fraud score may be determined or in some embodiments, a score may be determined for each type and number of fraudulent characteristics and combined to determine a total fraud score.

At a Step 518, in some embodiments, the application may suggest action or automatically take action based on the determined likelihood or fraud score indicative of the fraudulent document. For example, the known authentic entity 208 that is being represented on the fraudulent document may be informed of the document 200 and the document 200 may be sent to the entity 208 for further analysis. In some embodiments, the document 200 and the stored analysis indicative of the determination of the fraudulent document may be sent to a legal authority.

The likelihood and the fraud score may be compared to rules that govern subsequent action based on binary, tiers, or threshold values. For example, if the document 200 contains the special characters as described above, and the document fingerprint 300 includes the same special characters, the document 200 may automatically be labeled as authentic without further analysis. This may be a minimum threshold for authenticity of the document 200 containing the special characters. In another exemplary scenario, the document 200 may contain a different number that does not match the associated document fingerprint 300. A low likelihood based on the type of characteristic being different is applied but, by rule, further analysis may be performed to determine authenticity. The application may look at the year for the tax filing and it may be determined that the W-2 is filed for year 2017 and the number did not match because a different number was used for the 2017 tax filings. The document 200 may then be recategorized with W-2s from 2017 and another analysis performed. The number matches the 2017 W-2s for APP and the form is approved as authentic.

At a Step 520, the authenticated document 200 and authenticated characteristics are stored with the document fingerprint 300 data for creating an updated document fingerprint with the authenticated characteristics stored and used to determine the baseline document fingerprint. When it is determined that the document 200 is authentic, the document 200 and the document 200 characteristics are stored and the analyzed characteristics are added to the database for creating the document fingerprint 300. Any characteristics determined to be authentic may be added to the statistical analysis for determining the baseline characteristics for the document fingerprint 300. The application may implement any statistical modeling, artificial intelligence, neural networks, and machine learning algorithms to calculate and update document fingerprints and comparisons with the documents and the likelihood models for determining the likelihood and fraud scores indicative of fraudulent documents.

In some embodiments a compensation factor may be applied to the compensating for errors. For example the compensation factor may compensate for errors related to image location of the page, zoom, or relative size of the image, as well as image quality and resolution. In some embodiments, these compensation factors may be calculated with the error factor such that these sources of error may be removed or decreased in the calculations. Taking these possible sources of error into account may create a more accurate representation of errors.

In some embodiments, FIGS. 3 and 4 may be combined to create a single method for analyzing the document 200 then, upon determination of authenticity of the document 200, categorize and store the document 200 and use the document characteristics as a document fingerprint 300 for analysis of future documents. The separation into two methods is for simplicity in explanation only.

Although the invention has been described with reference to the embodiments illustrated in the attached drawing figures, it is noted that equivalents may be employed and substitutions made herein without departing from the scope of the invention.

Having thus described various embodiments, what is claimed as new and desired to be protected by Letters Patent includes the following:

1. One or more non-transitory computer-readable media storing computer-executable instructions that, when executed by a processor, perform a method of comparing a first document with a document fingerprint for authenticating the first document, the method comprising the steps of:
obtaining the first document comprising sensitive information;
obtaining data-layer information associated with the first document;
comparing the data-layer information with the document fingerprint comprising information obtained from at least one second document;
determining, from the comparison, a likelihood of the first document being fraudulent;
creating baseline data-layer information from at least the first document and the second document, wherein the baseline data-layer information is an average of characteristic values associated with the data-layer information; and
determining the likelihood of authenticity from a comparison of the at least one document fingerprint with the document data-layer information associated with one or more documents.

2. The method of claim 1, further comprising the step of determining a company associated with the first document from the data-layer information.

3. The method of claim 2, wherein the data-layer information comprises at least one document characteristic indicative of information visible on a user interface layer of the first document.

4. The method of claim 1, wherein the data-layer information is indicative of at least one of a character, blocks of characters, text, a special character, a document object, locations of the text, the character, and the blocks of characters, and a location of the document object.

5. The method of claim 4, wherein the special character is indicative of an entity associated with the first document.

6. The method of claim 5, wherein the entity is a payroll service provider and the first document is a tax document.

7. The method of claim 6, wherein the first document is obtained automatically at periodic times.

8. The method of claim 1, further comprising the steps of:
determining a fraud score from the likelihood; and
determining a rule based on a comparison of the fraud score to a threshold.

9. The method of claim 1, wherein the document fingerprint is determined from a plurality of documents with similar characteristics.

10. The method of claim 1, further comprising the step of categorizing the first document based on the data-layer information and determining the document fingerprint for comparison based at least in part on the categorization.

11. One or more non-transitory computer-readable media storing computer-executable instructions that, when executed by a processor, perform a method of creating a document fingerprint for authenticating a document, the method comprising the steps of:
receiving a plurality of documents;
obtaining data-layer information associated with each document of the plurality of documents;
comparing the data-layer information for each document;
categorizing each document based on the comparison of the data-layer information;
creating at least one document fingerprint based on the data-layer information associated with each document;
receiving the document to be authenticated;
determining a likelihood of authenticity of the document based on a comparison of the document and the at least one document fingerprint;
creating baseline data-layer information from the plurality of documents, wherein the baseline data-layer information is an average of characteristic values associated with the data-layer information; and determining the likelihood of authenticity from a comparison of the at least one document fingerprint with the document data-layer information associated with the document.

12. The method of claim 11, wherein the data-layer information comprises at least one of text, a special character, and a document object.

13. The method of claim 12, wherein the special character is indicative of at least one of a user associated with the document, a company associated with the user, and an entity associated with the company.

14. The method of claim 13, further comprising the step of categorizing the document based on the special character, wherein the entity is a payroll service provider and the document is a tax document.

15. The method of claim 11, further comprising the steps of:

determining a fraud score from the likelihood of authenticity; and determining a rule based on a comparison of the fraud score to a threshold.

16. A method of creating a document fingerprint and comparing the document fingerprint to a document for authenticating the document, the method comprising the steps of:

receiving a plurality of documents;

obtaining data-layer information associated with each document of the plurality of documents;

comparing the data-layer information for each document;

categorizing each document based on the comparison of the data-layer information;

creating baseline data-layer information from the plurality of documents for each category, wherein the baseline data-layer information is an average of characteristic values associated with the data-layer information;

creating at least one document fingerprint based at least in part on the baseline data-layer information for each category;

receiving the document to be authenticated; and determining a likelihood of authenticity of the document based at least in part on a comparison of the document and the at least one document fingerprint.

17. The method of claim 16, wherein the document is received from a mobile device, and wherein the document is an image captured from a camera associated with the mobile device.

18. The method of claim 17, further comprising the step of receiving mobile device information indicative of the mobile device, wherein the at least one document fingerprint further comprises the mobile device information.

19. The method of claim 18, wherein the mobile device information is at least one of GPS location, IP address, metadata, date and time, and mobile device type.

20. The method of claim 19, further comprising the steps of:

determining the likelihood of authenticity of the document based at least in part on the mobile device information;

determining a fraud score from the likelihood of authenticity; and determining a rule based on a comparison of the fraud score to a threshold.

* * * * *